No. 861,174. PATENTED JULY 23, 1907.
J. A. HEIL.
GOPHER TRAP.
APPLICATION FILED MAR. 16, 1907.
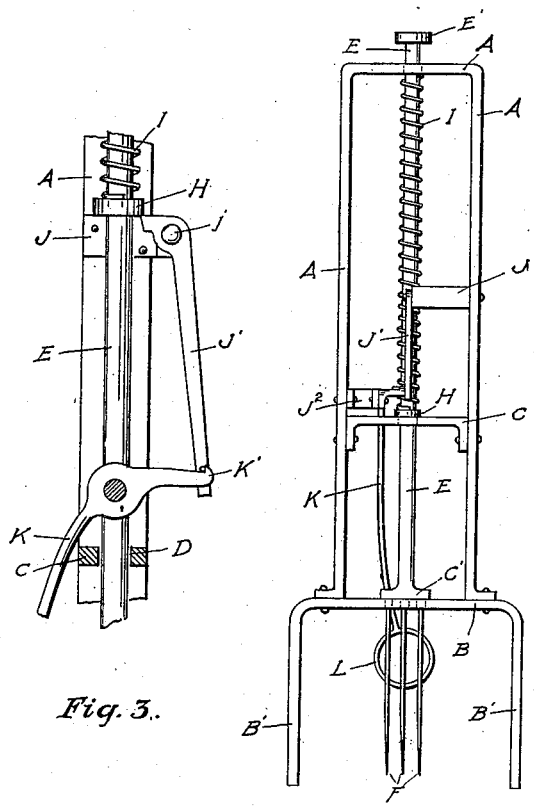
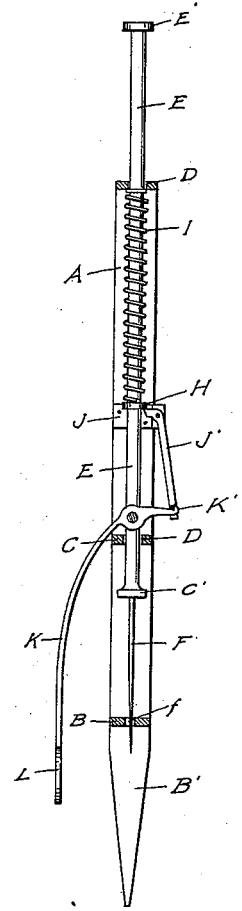
Fig. 3. Fig. 1. Fig. 2.
Witnesses
A. B. Cornelius
E. O. Gibbons
Inventor:
John A. Heil
By Eugene Ayres,
Attorney

UNITED STATES PATENT OFFICE.

JOHN A. HEIL, OF WATHENA, KANSAS.

GOPHER-TRAP.

No. 861,174.	Specification of Letters Patent.	Patented July 23, 1907.

Application filed March 16, 1907. Serial No. 362,764.

*To all whom it may concern:*

Be it known that I, JOHN A. HEIL, a citizen of the United States, residing at Wathena, in the county of Doniphan and State of Kansas, have invented certain new and useful Improvements in Gopher-Traps; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Persons conversant with gardening, fruit raising and farming realize the fact that one of the most destructive class of pests with which they have to contend is the rodents known as gophers.

The purpose of my invention is to provide a trap by which these destructive animals may be exterminated, or at least decimated.

I accomplish my object by the mechanism illustrated in the accompanying drawings in which Figure 1 is a rear view of the gopher trap, the mechanism shown in the position occupied when not set; Fig. 2 is a side view showing the trap set, and Fig. 3 is a detail of the mechanism by which the trap is sprung as the gopher attempts to pass through the ring shown in Figs. 1 and 2.

Similar letters refer to similar parts in the several views.

A is a metal frame rigidly attached on or cast as a part of a base B. The ends of this base are bent downward at right angles with said base, forming prongs B′ B′, the sharp ends of which may be readily thrust sufficiently far beneath the surface of the ground at any place where a gopher is operating, to hold the device firmly in position. A flat strap C connects the two uprights of frame A. Said strap and the top of frame A are provided with corresponding orifices D D.

E is a rod provided with a nut or cap E′ serving as a knob at its upper end, and with an elongated support C′ at its lower end adapted to rest on base B. Said rod travels through orifices D D. The lower end of said rod and its elongated support C′ carry tines F F, preferably three, which travel through a corresponding number of perforations $ff$ in base B. Rod E is provided with a shoulder H. A spiral spring I encircles said rod, resting on said shoulder at its base, and contacting at its upper end with the top of said frame A. A lug J, on one of the sides of the frame, projects horizontally to a point back of said rod and spring. An outwardly oscillating arm J′ is carried on the unattached end of said lug by a pin $j$. At a point on the opposite side of said frame A, somewhat above flat strap C, a trip arm K is pivotally attached to a lug $J^2$. The lower end of this arm is provided with a rigidly fastened ring L adapted to set on a line vertically somewhat in front of the vertical plane of the frame. The upper end of said trip arm is provided with a catch K′ with which, when the trap is set as shown in Figs. 2 and 3, the unattached end of arm J′ is adapted to engage. When rod E is drawn up and the trap set, the points of tines F F are at a horizontal slightly above the upper part of the periphery of ring L, as shown in Fig. 2. When the gopher attempts to emerge from the opening of its burrow, at which said ring L is placed, and as the gopher's shoulders crowd through the ring, catch K′ and the unattached end of arm J′ are disengaged; at the same instant, rod E is carried down by the force of spring I and tines F F penetrate the body of the gopher.

What I claim and desire to secure by Letters Patent is:—

The combination in a gopher trap of an elongated frame, its top provided with an orifice, a connecting strap provided with a corresponding orifice, a base provided with perforations and prongs on said base projecting downward, a rod adapted to travel in said orifices, a support at the bottom of said rod, a cap at the top thereof and a shoulder intermediate thereon, a spring encircling said rod from the shoulder to the top of said frame, tines carried by said rod and supports adapted to travel in said perforations, a lug on one side of said frame having an unattached end projecting back of said rod and spring, an oscillatory arm pivoted thereto, a trip arm pivotally attached to the opposite side of said frame, a ring at the lower end of said arm and a catch at its upper end adapted to engage with the unattached end of said oscillatory arm, substantially as set forth and shown.

In testimony whereof, I affix my signature, in presence of two witnesses.

JOHN A. HEIL.

Witnesses:
WILLIAM ETSCHMAN,
EVANGELINE O. GIBBONS.